United States Patent [19]

Karasudani

[11] 4,161,239
[45] Jul. 17, 1979

[54] DISC BRAKE
[75] Inventor: Yasuo Karasudani, Yokohama, Japan
[73] Assignee: Tokico Ltd., Kanagawa, Japan
[21] Appl. No.: 861,448
[22] Filed: Dec. 16, 1977
[30] Foreign Application Priority Data
Dec. 29, 1976 [JP] Japan .................. 51/160385
[51] Int. Cl.² ............................................ F16D 65/20
[52] U.S. Cl. .................. 188/106 P; 188/71.8; 188/345
[58] Field of Search ............. 188/71.8, 72.4, 72.5, 188/106 R, 106 P, 345, 367, 368
[56] References Cited
U.S. PATENT DOCUMENTS

| 3,312,313 | 4/1967 | Moyer | 188/106 P |
| 3,421,604 | 1/1969 | Hobbs | 188/196 P X |
| 3,608,678 | 9/1971 | Kobayashi | 188/345 X |
| 3,949,846 | 4/1976 | Hayashida | 188/106 P X |

Primary Examiner—Duane A. Reger
Attorney, Agent, or Firm—Wenderoth, Lind & Ponack

[57] ABSTRACT

A disc brake includes a caliper defining a cylinder body therein, a first piston slidably and sealingly received in the cylinder body, an inner cylinder disposed within the first piston and a second piston slidably and sealingly received in the inner cylinder. The outer periphery of the first piston is in slidable and sealable contact with the inner periphery of the cylinder body and the outer periphery of the inner cylinder is in contact with the inner periphery of the first piston for slidable and sealable movement with the latter and defines a first hydraulic chamber. The outer periphery of the second piston is in slidable and sealable contact with the inner periphery of the inner cylinder and together with the inner cylinder, defines a second hydraulic chamber.

8 Claims, 4 Drawing Figures

DISC BRAKE

BACKGROUND OF THE INVENTION

This invention relates to a disc brake adapted to be operated by a dual control liquid pressure system. In many vehicles, in order to obtain a safe and positive braking operation, brakes adapted to be operated by dual control liquid pressure systems have been and are being employed.

FIG. 1 of the accompanying drawings shows one of the prior art brakes of the above type in which a stepped piston is provided and in which during braking operation, liquid under pressure is supplied into hydraulic chambers $A_1$ and $A_2$ from a common master cylinder. When the brake is to be released, such release operation relies upon the elastic deformation or roll back of seals $S_1$ and $S_2$. Thus, in order to obtain rapid and positive separation between the disc and friction pads after a particular braking operation, the design preferably provides that all the seals between the piston and caliper produce a force due to the so-called roll back so as to retract the piston to its initial or non-application position, to thereby improve the operation efficiency. However, if only the seals $S_1$ and $S_2$ are employed (in which case, there would be no drain D provided because the liquid under pressure from the hydraulic chamber $A_2$ would tend to flow out through the drain if any) and the seal $S_2$ becomes damaged, although the liquid under pressure tends to flow out between the piston and caliper whereby damage on the seal $S_2$ can be detected, when the seal $S_1$ becomes damaged, communication is established between the hydraulic chambers $A_1$ and $A_2$, but damage to the seal $S_1$ can not be detected. Therefore, in the prior art disc brake of FIG. 1, an additional intermediate seal $S_3$ is positioned between the hydraulic chamber $A_2$ and seal $S_1$ and a drain D is provided extending from between the seals $S_1$ and $S_3$ to the exterior of the device. According to this design, if and when the seal $S_1$ becomes damaged, the liquid under pressure within the hydraulic chamber $A_1$ is prevented from flowing into the hydraulic chamber $A_2$ by the presence of the additional intermediate seal $S_3$ and is diverted to the exterior of the device through the drain D whereby damage to the seal $S_1$ can be detected. However, the prior art disc brake as shown in FIG. 1 has the disadvantage that the roll back effect provided by the seals $S_1$ and $S_2$ is impeded by the seal $S_3$. In other words, the seal $S_3$ itself has no roll back effect (the roll back effect can not be obtained unless the direction of liquid pressure from the hydraulic chamber $A_2$ to which the seal $S_3$ is subjected corresponds to that in which the piston advances when the disc brake is applied) and thus, the resistance offered by the seal $S_3$ tends to impede the roll back effect provided by the seals $S_1$ and $S_2$ and, thus, the sliding movement of the piston.

FIG. 2 of the accompanying drawings shows another prior art disc brake in which the piston employed is a cup-shaped piston and the additional intermediate seal $S_3$ as shown in the prior art disc brake of FIG. 1 is eliminated because provision of the intermediate seal is difficult in the device of FIG. 2. When the disc brake is released, the piston is retracted to its initial or non-application position by the roll back effect. The seal $S_5$ which separates the hydraulic chambers $A_3$ and $A_4$ is subjected to pressure on the opposite sides thereof or from the hydraulic chambers $A_3$ and $A_4$, and as a result, the seal $S_5$ does not provide any roll back effect to thereby impede the roll back effect provided by the seal $S_4$.

Therefore, in the above two prior art piston arrangement systems, it was difficult to obtain both proper designing of the additional or intermediate seal and proper provision of the roll back effect of the seals.

SUMMARY OF THE INVENTION

Thus, the purpose of the present invention is to provide a disc brake which can effectively eliminate the disadvantages inherent in the prior art disc brakes referred to hereinabove.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

Figure 3:
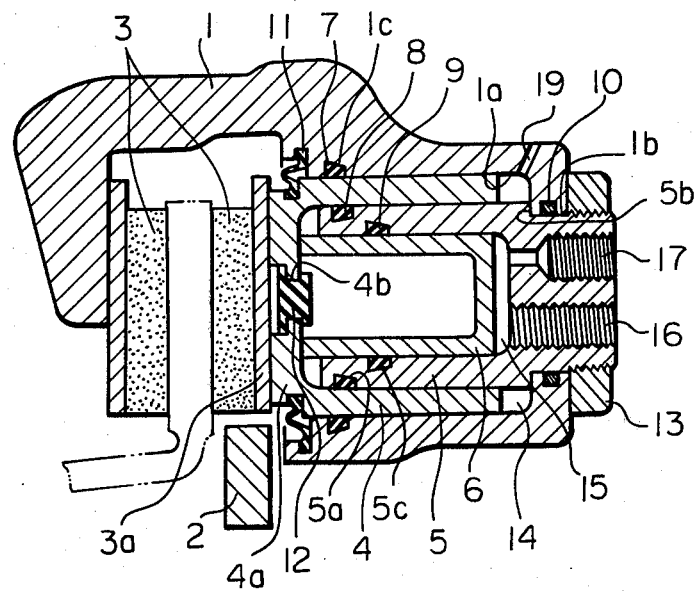
FIG. 3 is a cross-sectional view of a first embodiment of a disc brake constructed in accordance with the present invention.

PREFERRED EMBODIMENTS OF THE INVENTION:

Referring now to FIG. 3 of the accompanying drawings in which the first embodiment of disc brake of the invention is shown, reference numeral 1 generally denotes the caliper of the disc brake and the caliper defines a caliper body 1a therein for receiving a hollow first or outer piston 4, an inner cylinder 5 and a hollow second or inner piston 6. Reference numeral 2 denotes a stationary member which is adapted to be mounted on a stationary part of a vehicle (not shown), and one of pads 3, 3 adapted to be applied against one side of the disc directly by the first piston 4 and its associated backing plate 3a is slidably mounted in the stationary member 2. The pads 3, 3 are adapted to be applied against the opposite sides of the disc to brake the same in the conventional manner. As in the conventional disc brakes, the other pad and its associated backing plate are so mounted on the caliper that they are positioned in opposition to the first-mentioned pad and backing plate so as to embrace the disc in cooperation therewith.

The hollow first piston 4 has a substantially cup-shaped configuration and is slidably received in the cylinder body 1a and is maintained in sealed relationship to the cylinder body by means of an annular seal 7 which is received in an annular recess formed in the inner periphery of the cylinder body. The first piston 4 has formed in the bottom 4a thereof, at a position adjacent to the center of the bottom, with a bore 4b which serves as an air vent when the disc brake is assembled and is normally closed by a plug 12 which is preferably resilient. The bottom 4a of the piston 4 is in contact with the outer side of the backing plate 3a associated with the first-mentioned pad 3 so that when the piston 4 is advanced or moved inwardly, the movement of the piston is directly transmitted to the backing plate. An annular recess is provided in the periphery of the bottom 4a of the piston 4 for receiving an annular dust boot 11 which serves to prevent foreign matter from invading the cylinder body 1a. The outer periphery of the dust boot 11 is received and is held in position within an annular recess formed in the inner periphery of the cylinder body.

The inner cylinder 5 is received in the first piston 4 and is open at the end adjacent to the bottom 4a of the first piston 4. An annular recess or groove 5a is formed in the outer periphery of the inner cylinder 5 and an annular second seal 8 is received in the recess to maintain the cylinder 5 in sealed relationship to the first piston 4. The right-hand end of the outer periphery of the inner cylinder 5 (as seen in FIG. 3) is formed with an annular step or shoulder 5b and a reduced diameter portion which includes an inner plain portion and an outer threaded portion. The inner cylinder piston 5 has a length substantially greater than that of the first piston 4 so that the reduced diameter portion of the cylinder extends beyond the adjacent open end or the right-hand end 1b of the cylinder body 1a (as seen in FIG. 3). An O-ring 10 is received in an annular recess formed in the inner periphery of the cylinder body 1a at the right-hand end 1b thereof to maintain sealing relationship between the cylinder body 1a and the reduced diameter portion of the inner cylinder 5. A nut 13 is threaded on the threaded portion of the reduced diameter portion at the right-hand end of the inner cylinder 5. The nut 13 secures the inner cylinder 5 to the cylinder body 1a in cooperation with the open end 1b which abuts against the shoulder 5b on the inner cylinder 5. The outer periphery of the inner cylinder 5 defines a first hydraulic chamber 14 in cooperation with the cylinder 1a and the adjacent end or right-hand end of the first piston 4 (as seen in FIG. 3). The first hydraulic chamber 14 is in communication with a master cylinder (not shown) through a first radial passage 19 formed in the caliper 1.

The reduced diameter right-hand end portion of the inner cylinder 5 is provided with an axial second passage 16 and an axial bleeder port 17 which is parallel to the second passage. The second passage 16 is in communication with the master cylinder and the bleeder port 17 serves as an air vent for the liquid within a second hydraulic chamber of which description will be made hereinafter and is adapted to be closed after air passes through the second hydraulic chamber.

The second piston 6 has a substantially cup-shaped configuration which opens at the end thereof adjacent to the bottom 4a of the first piston 4 and the second piston is slidably received within the inner cylinder 5. An annular third seal 9 is received in an annular recess 5c formed in the inner periphery of the inner cylinder 5 to maintain sealed relationship between the cylinder and second piston 6. The annular recess 5c is preferably positioned offset with respect to the annular recess 5a by a certain distance in the axial direction of the inner cylinder 5 as shown in FIG. 3 so that these recesses do not overlap one another in the axial direction of the cylinder. Such axial offset arrangement of the annular recesses 5a and 5c can allow the thickness of the wall of the inner cylinder 5 to be reduced. The open end of the second piston 6 faces the bottom 4a of the first piston 4, while the closed end of the piston 6 defines the second hydraulic chamber 15 in cooperation with the adjacent end of the inner cylinder 5 whereat the shoulder 5b is provided.

In the embodiment as shown in FIG. 3, it is to be noted that both the seals 8 and 9 are designed so as to produce the so-called roll back effect which moves the first and second pistons 4 and 6 back rightwards after they have been advanced or moved leftwards (as seen in FIG. 3) by the restoration force provided by the elastic deformation of the seals.

For this purpose, each of the annular recesses 1c, 5a and 5c includes a bottom which is inclined so as to extend away from the inner periphery of the piston 4 or the outer periphery of the piston 6 in a leftward direction as seen in FIG. 3 and sides which define the opposite ends of the bottom. One of the sides of each of the annular recesses (the left-hand side as seen in FIG. 3) bodily inclines leftwardly as seen in FIG. 3 to increase its radial depth or is partially bevelled to thereby provide a space which allows the elastic deformation of each of the seals 7, 8 and 9. The seals 7, 8 and 9 employed in the embodiment of FIG. 3 are in the form of the so-called angular rings having a square cross-section. The individual seals and their associated recesses are conventional ones which are usually employed to give the roll back effect to the seals.

In the operation of the disc brake as shown in FIG. 3, liquid under pressure supplied by the master cylinder flows into the first hydraulic chamber 14 and the second hydraulic chamber 15 via the first passage 19 and the second passage 16, respectively, to expand the first and second hydraulic chambers 14 and 15 which in turn perform the braking operation in the conventional manner. After the braking operation is completed or the disc has been released from the braking force, the first and second pistons assume their initial position with respect to the caliper 1 by the roll back effect provided by the seals 7, 8 and 9.

In the embodiment of FIG. 3, if and when the first seal 7 becomes damaged, the liquid within the first hydraulic chamber 14 flows through the dust boot 11 to the exterior of the cylinder body 1a whereby damage to the seal can be easily and promptly detected. On the other hand, if and when the second seal 8 and/or the third seal 9 become damaged, the liquid within the first hydraulic chamber 14 and/or the second hydraulic chamber 15 flows out from between the open end of the second piston 6 and the bottom inner face of the first piston 4 and about the plug 12 to the exterior of the cylinder body 1a whereby damage to the second and/or third seal can be also easily and promptly detected.

Since the first seal 7 and second seal 8 are associated with the first piston 4 which is advanced or moved leftwards as seen in FIG. 3 under the pressure of liquid within the first hydraulic chamber 14 when the disc brake is applied, the first and second seals 7 and 8 are subjected to hydraulic pressure in the same direction and elastically deformed thereby, so a substantial amount of roll back energy or force is stored in the seals. Thus, when the disc brake is released, the first piston 4 can be easily and promptly retracted or moved rightwards as seen in FIG. 3 by virtue of the roll back effect provided by the seals. Similarly, since the third seal 9 is associated with the second seal 6 and the second piston is advanced or moved leftwards under the pressure of the liquid within the second hydraulic chamber 15 when the disc brake is applied, the third seal 9 is subjected to hydraulic pressure in the same direction, and a substantial amount of roll back energy is stored in the seal. Thus, as in the case of the first piston, the second piston can be easily and promptly retracted or moved rightwards by virtue of the roll back energy stored in and provided by the third seal. As is clear from the foregoing description, according to the present invention, when the first and second pistons are moved reciprocally, the seals associated with the first piston and the seal associated with the second seal will not interfere with each other, and the pistons will be subjected to the roll back energy or force provided by their respectively associated seals to thereby eliminate the disadvantages inherent in the conventional disc brakes as shown in FIGS. 1 and 2.

Figure 4:
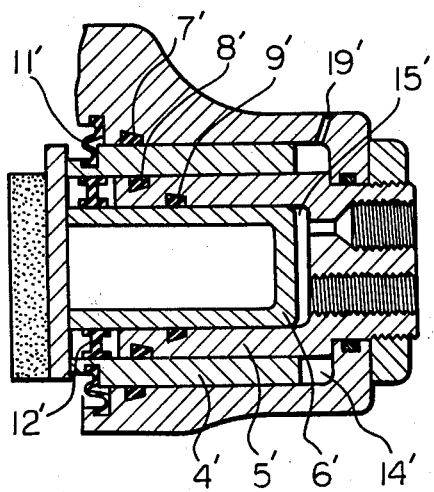
FIG. 4 is a cross-sectional view of a second embodiment of a disc brake constructed in accordance with the present invention.

Reference is made now to FIG. 4 of the accompanying drawings in which the second embodiment of a disc brake of the invention is shown and in which the parts of the second embodiment which correspond to those of the first embodiment are assigned the same numerals as those employed for the corresponding parts of the first embodiment with the addition of "prime" thereto, respectively. The second embodiment is substantially similar to the first embodiment except that the first piston 4' is in the form of a hollow cylinder, the left-hand end of the first piston and the left-hand end of the second piston 6' are in direct contact with one pad and backing plate unit of the pair of pad and backing plate units, and the inner periphery of the first piston 4' and the outer periphery of the second piston 6' are maintained in sealed relationship in a position extending beyond the left-hand end of the inner cylinder 5' by means of an annular plug 12'. The functions of the component parts of the second embodiment are substantially identical with those of the corresponding parts of the first embodiment. That is, damage to the first seal 7' can be detected by the leakage of liquid flowing through the dust boot 11', and damage to the second and/or third seals 8' and/or 9' can be detected by the leakage of liquid flowing through the plug 12'. The second embodiment has the advantage over the first embodiment that the component parts of the second embodiment can be processed and assembled in a simpler manner.

Figure 1:
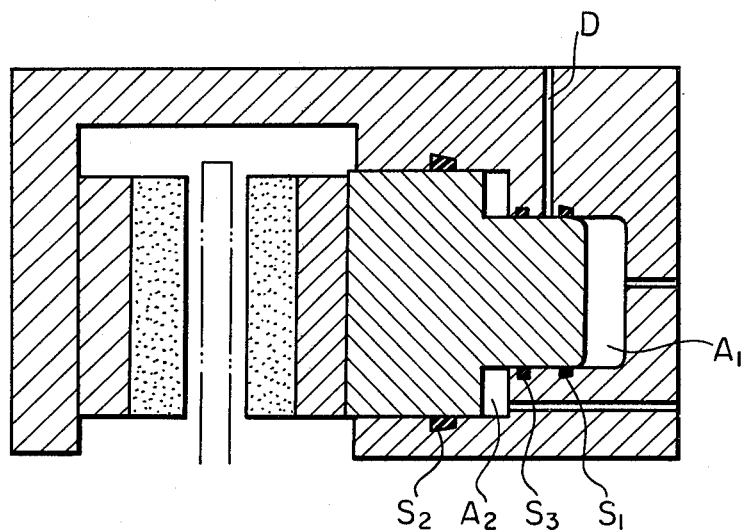
FIGS. 1 and 2 are cross-sectional views of conventional disc brakes.
Figure 2:
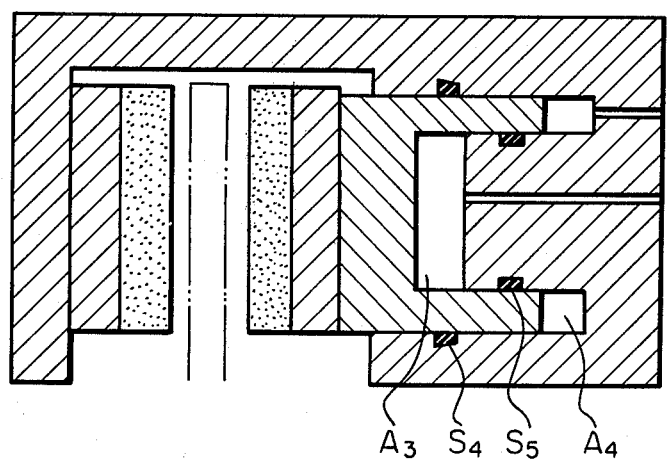

With the above construction and arrangement of the component parts, according to the present invention, the intermediate seal as employed in the conventional disc brake of FIG. 1 can be eliminated and the independent drain as employed in the conventional disc brake of FIG. 1 is not necessary for detecting seal damage. Furthermore, there is no means which interferes with the roll back effect provided by the seals, and thus prompt and positive retraction of the pistons and the like is effected.

Although the present invention has been described in connection with the floating caliper-type disc brake, the invention can be equally applied to the cylinder of the two-pot type disc brake in which pistons are disposed on the opposite sides of a disc and of the drum brake.

While only two embodiments of the invention have been shown and described in detail, it will be understood that the same are for illustration purposes only and not to be taken as a definition of the invention, reference being had for this purpose to the appended claims.

What is claimed is:
1. A brake cylinder comprising:
   a cylinder body;
   a first piston slidably received in said cylinder body, said first piston having an outer periphery in liquid-tight relationship with said cylinder body;
   an inner cylinder having an outer end fixedly secured to said cylinder body, an open inner end, and an outer periphery in liquid-tight sliding relationship with an inner periphery of said first piston;
   said outer periphery of said inner cylinder, said first piston, and said cylinder body together defining a first hydraulic chamber;
   a second piston slidably received in said inner cylinder, said second piston having an outer periphery in liquid-tight relationship with an inner periphery of said inner cylinder;
   said second piston having an outer end cooperating with said outer end of said inner cylinder to define a second hydraulic chamber;
   said cylinder body having therein a first annular recess receiving a first annular seal member slidably contacting said outer periphery of said first piston and forming a liquid-tight slidably seal between said cylinder body and said outer periphery of said first piston;
   said outer periphery of said inner cylinder having therein a second annular recess receiving a second annular seal member slidably contacting said inner periphery of said first piston and forming a liquid-tight slidable seal between said inner periphery of said first piston and said outer periphery of said inner cylinder;
   said inner periphery of said inner cylinder having therein a third annular recess receiving a third annular seal member slidably contacting said outer periphery of said second piston and forming a liquid-tight slidable seal between said inner periphery of said inner cylinder and said outer periphery of said second piston;
   said first and second pistons being axially slidably movable in a first direction from respective initial positions thereof to respective braking positions thereof by liquid pressure supplied into said first and second hydraulic chambers, respectively; and
   said seal members and the respective said recesses thereof having a configuration such that said seal members comprise means for storing therein restoring forces for, upon the release of said liquid pressure, returning said first and second pistons from said respective braking positions thereof to said respective initial positions thereof.

2. A brake cylinder as claimed in claim 1, wherein said first piston has a substantially cup-shaped configuration including a closed inner end for directly acting on a first friction pad, and said second piston has an inner end in abutment against said closed inner end of said first piston.

3. A brake cylinder as claimed in claim 2, wherein said closed inner end of said first piston is provided with a bore for communicating between the interior of said first piston and the exterior atmosphere, and a plug normally closing said bore.

4. A brake cylinder as claimed in claim 1, wherein said first piston has a hollow cylindrical configuration, and the first piston and said second piston are adapted to directly act on a first friction pad.

5. A brake cylinder as claimed in claim 4, wherein said open inner end of said inner cylinder and said first and second pistons define therebetween a cylindrical space, and a cylindrical plug provided between said inner periphery of said first piston and said outer periphery of said second piston, said cylindrical plug closing said cylindrical space.

6. A brake cylinder as claimed in claim 1, wherein said second and third seal members are positioned in axially spaced relationship with respect to each other.

7. A brake cylinder as claimed in claim 1, wherein the radial depths of said recesses and the radial thicknesses of said seal members increase axially from said outer end to said inner end of said inner cylinder.

8. A brake cylinder as claimed in claim 1, wherein said outer end of said inner cylinder is closed, and said outer end of said second piston is closed.

* * * * *